United States Patent
Park et al.

(10) Patent No.: US 9,386,535 B2
(45) Date of Patent: Jul. 5, 2016

(54) METHOD FOR DETERMINING TRANSMISSION POWER INFORMATION OF DOWNLINK SUBFRAME AND APPARATUS THEREFOR

(71) Applicant: LG ELECTRONICS INC., Seoul (KR)

(72) Inventors: Hanjun Park, Anyang-si (KR); Eunsun Kim, Anyang-si (KR); Hanbyul Seo, Anyang-si (KR); Seungmin Lee, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/350,554

(22) PCT Filed: Oct. 26, 2012

(86) PCT No.: PCT/KR2012/008867
§ 371 (c)(1),
(2) Date: Apr. 8, 2014

(87) PCT Pub. No.: WO2013/062359
PCT Pub. Date: May 2, 2013

(65) Prior Publication Data
US 2014/0269597 A1 Sep. 18, 2014

Related U.S. Application Data

(60) Provisional application No. 61/623,034, filed on Apr. 11, 2012, provisional application No. 61/611,559, filed on Mar. 15, 2012, provisional application No. 61/610,452, filed on Mar. 13, 2012, provisional application No. 61/551,449, filed on Oct. 26, 2011.

(51) Int. Cl.
*H04B 7/212* (2006.01)
*H04W 52/22* (2009.01)
(Continued)

(52) U.S. Cl.
CPC ........... *H04W 52/228* (2013.01); *H04J 11/005* (2013.01); *H04W 52/262* (2013.01);
(Continued)

(58) Field of Classification Search
CPC . H04W 24/10; H04W 84/045; H04W 72/082; H04L 25/0202; H04L 27/2636
See application file for complete search history.

(56) References Cited

U.S. PATENT DOCUMENTS

| 8,724,559 | B2 * | 5/2014 | Kim | H04L 1/0015 370/329 |
| 8,730,861 | B2 * | 5/2014 | Montojo | H04W 72/082 370/312 |

(Continued)

OTHER PUBLICATIONS

Wang et al, Power Offset Compensation Schemes Between CRS and DRS for Downlink Dual Layer Beamforming in LTE System, Aug. 25-27, 2010, ChinaCom 2010, 4 pages.*

(Continued)

*Primary Examiner* — Mounir Moutaouakil
(74) *Attorney, Agent, or Firm* — Lee, Hong, Degerman, Kang & Walmey; Jonathan Kang; Michael Monaco

(57) ABSTRACT

A method for an eNB to transmit a downlink signal to a User Equipment (UE) is disclosed. The method includes transmitting information about a data transmission power within an OFDM symbol in a data region of a downlink subframe to the UE. The information about the data transmission power is determined according to a specific condition and the specific condition includes at least one of presence/absence of a Cell-specific Reference Signal (CRS) within the symbol and a modulation scheme or a Modulation and Coding Scheme (MCS) of the symbol. The downlink subframe is a Non-Zero Power Almost Blank Subframe (NZP ABS) in which signals are transmitted at a lower transmission power than a transmission power of a normal subframe on downlink.

14 Claims, 8 Drawing Sheets

(51) Int. Cl.
*H04J 11/00* (2006.01)
*H04W 52/26* (2009.01)
*H04W 72/04* (2009.01)
*H04W 52/36* (2009.01)
*H04L 5/00* (2006.01)
*H04W 52/38* (2009.01)

(52) U.S. Cl.
CPC ........... *H04W72/042* (2013.01); *H04L 5/0007* (2013.01); *H04L 5/0053* (2013.01); *H04W 52/362* (2013.01); *H04W 52/367* (2013.01); *H04W 52/38* (2013.01); *Y02B 60/50* (2013.01)

(56) References Cited

U.S. PATENT DOCUMENTS

| | | | |
|---|---|---|---|
| 8,811,510 B2* | 8/2014 | Zhuang et al. | 375/267 |
| 2011/0085618 A1* | 4/2011 | Zhuang et al. | 375/296 |
| 2011/0116437 A1* | 5/2011 | Chen et al. | 370/312 |
| 2011/0275394 A1* | 11/2011 | Song et al. | 455/509 |
| 2011/0310830 A1* | 12/2011 | Wu et al. | 370/329 |
| 2012/0033595 A1* | 2/2012 | Aoyama et al. | 370/311 |
| 2012/0044872 A1* | 2/2012 | Aydin et al. | 370/328 |
| 2012/0115469 A1* | 5/2012 | Chen et al. | 455/434 |
| 2012/0207119 A1* | 8/2012 | Zhang | H04L 5/0023 370/329 |
| 2012/0213107 A1* | 8/2012 | Jang et al. | 370/252 |
| 2012/0213137 A1* | 8/2012 | Jeong et al. | 370/311 |
| 2012/0275322 A1* | 11/2012 | Ji et al. | 370/252 |
| 2012/0307922 A1* | 12/2012 | Simonsson et al. | 375/260 |
| 2012/0327821 A1* | 12/2012 | Lin et al. | 370/280 |
| 2013/0003578 A1* | 1/2013 | Hu et al. | 370/252 |
| 2013/0017793 A1* | 1/2013 | Henttonen et al. | 455/63.1 |
| 2013/0028149 A1* | 1/2013 | Chen et al. | 370/280 |
| 2013/0028161 A1* | 1/2013 | Maeda et al. | 370/311 |
| 2013/0029657 A1* | 1/2013 | Gao et al. | 455/422.1 |
| 2013/0039338 A1* | 2/2013 | Suzuki et al. | 370/331 |
| 2013/0040683 A1* | 2/2013 | Siomina | H04W 28/0236 455/517 |
| 2013/0045740 A1* | 2/2013 | Gayde et al. | 455/436 |
| 2013/0045770 A1* | 2/2013 | Aschan et al. | 455/522 |
| 2013/0058234 A1* | 3/2013 | Yang et al. | 370/252 |
| 2013/0176933 A1* | 7/2013 | Seo | H04J 11/0056 370/312 |
| 2013/0215811 A1* | 8/2013 | Takaoka | H04W 52/367 370/311 |
| 2013/0223235 A1* | 8/2013 | Hu | H04W 36/04 370/242 |
| 2013/0229971 A1* | 9/2013 | Siomina et al. | 370/312 |
| 2013/0242951 A1* | 9/2013 | Lee | H04W 56/001 370/336 |
| 2013/0286883 A1* | 10/2013 | Kim et al. | 370/252 |
| 2013/0315092 A1* | 11/2013 | Yu et al. | 370/252 |
| 2014/0092792 A1* | 4/2014 | Kim | H04L 5/0007 370/280 |
| 2014/0112254 A1* | 4/2014 | Lindoff et al. | 370/328 |
| 2014/0119334 A1* | 5/2014 | Kazmi et al. | 370/330 |
| 2014/0133448 A1* | 5/2014 | Xu | H04W 52/146 370/329 |
| 2014/0269597 A1* | 9/2014 | Park | H04W 72/042 370/329 |
| 2014/0313923 A1* | 10/2014 | Yang et al. | 370/252 |
| 2014/0341057 A1* | 11/2014 | Seo | H04W 24/10 370/252 |

OTHER PUBLICATIONS

Fujitsu, "Specification support for CoMP," 3GPP TSG-RAN1 #66bis, R1-113461, Oct. 2011, 3 pages.

Potevio, "Discussion of the candidate solutions of ABS interference management," 3GPP TSG RAN WG1 Meeting #66bis, R1-113028, Oct. 2011, 3 pages.

Panasonic, "Performance Evaluation of Cell Range Expansion in Combination with ABS Ratio Optimization," 3GPP TSG-RAN WG1 Meeting #66bis, R1-113118, Oct. 2011, 5 pages.

PCT International Application No. PCT/KR2012/008867, Notification of Transmittal of the International Search Report and the Written Opinion of the International Searching Authority, or Declaration dated Mar. 21, 2013, 9 pages.

* cited by examiner

METHOD FOR DETERMINING TRANSMISSION POWER INFORMATION OF DOWNLINK SUBFRAME AND APPARATUS THEREFOR

CROSS-REFERENCE TO RELATED APPLICATIONS

This application is the National Stage filing under 35 U.S.C. 371 of International Application No. PCT/KR2012/008867, filed on Oct. 26, 2012, which claims the benefit of U.S. Provisional Application Ser. No. 61/623,034, filed on Apr. 11, 2012, and 61/611,559, filed on Mar. 15, 2012, 61/610,452, filed on Mar. 13, 2012, and 61/551,449, filed on Oct. 26, 2011, the contents of which are all hereby incorporated by reference herein in their entirety.

TECHNICAL FIELD

The present invention relates to power allocation of a wireless communication system, and more particularly, to a method and apparatus for determining transmission power information for a specific downlink subframe for Intercell Interference Coordination (ICIC) in a multi-cell wireless communication system.

BACKGROUND ART

In this disclosure, the term heterogeneous network refers to a network in which a macro eNB and a micro BS coexist even when the same Radio Access Technology (RAT) is used. A heterogeneous cell refers to time-frequency resources in such a heterogeneous network.

For example, under the assumption of a heterogeneous network in which a micro eNB and macro eNB are adjacent to each other, if a User Equipment (UE) served by the micro eNB receives a desired signal from the micro eNB, the UE may be subjected to interference by a strong signal from the macro eNB.

Such interference may be expressed as intercell interference and the above example relates to intercell interference generated from the eNB to the UE on downlink. Similarly, intercell interference may also be generated from the UE to the eNB on uplink.

Accordingly, in a multi-cell wireless communication environment in which intercell interference is generated, a method for improving data demodulation performance of a UE configured to receive a specific downlink subframe and interference elimination performance of a UE affected by interference caused by the specific downlink subframe is needed by providing transmission power information for the specific downlink subframe.

DISCLOSURE OF INVENTION

Technical Problem

An object of the present invention devised to solve the problem lies in providing a method for supporting data demodulation performance and/or interference elimination performance of a UE in a multi-cell wireless communication system in which intercell interference exists.

It will be appreciated by persons skilled in the art that that the technical objects that can be achieved through the present invention are not limited to what has been particularly described hereinabove and other technical objects of the present invention will be more clearly understood from the following detailed description.

Solution to Problem

The object of the present invention can be achieved by providing a method for determining transmission power information of a downlink subframe when an eNB transmits a downlink signal to a User Equipment (UE), including transmitting information about a data transmission power within an OFDM symbol in a data region of the downlink subframe to the UE, wherein the information about the data transmission power is determined according to a specific condition and the specific condition includes at least one of whether a Cell-specific Reference Signal (CRS) is present within the symbol and a modulation scheme or a Modulation and Coding Scheme (MCS) of the symbol, and wherein the downlink subframe is a Non-Zero Power Almost Blank Subframe (NZP ABS) in which signals are transmitted at a lower transmission power than a transmission power of a normal subframe on downlink.

If the CRS is present within the symbol, the information about the data transmission power may be determined such that the data transmission power within the symbol is set to zero.

If the CRS is present within the symbol and the modulation scheme or the MCS does not permit the lower transmission power, the information about the data transmission power may be determined such that the data transmission power within the symbol is set to zero.

At least one of the information about the transmission power information and information about rate matching or puncturing performed for the subframe may be provided to a UE in a neighboring cell or the UE which is intended to receive the downlink signal.

The information about the data transmission power may be determined based on a transmission power of the CRS.

The information about the data transmission power may include a UE-specific parameter for the subframe, a subframe-specific parameter, and transmission power offset information.

Indication information about the NZP ABS may be transmitted to the UE and the indication information may be information indicating a pattern of the NZP ABS or bitmap information indicating whether the NZP ABS is present.

In another aspect of the present invention, provided herein is a method for receiving a Physical Downlink Shared Channel (PDSCH) when a User Equipment (UE) receives a downlink signal, including receiving information about a data transmission power within an OFDM symbol in a data region of a downlink subframe and demodulating a downlink data signal in the downlink subframe based on the information about the transmission power, wherein the information about the data transmission power is determined according to a specific condition and the specific condition includes at least one of whether a Cell-specific Reference Signal (CRS) is present within the symbol and a modulation scheme or a Modulation and Coding Scheme (MCS) of the symbol, and wherein the downlink subframe is a Non-Zero Power Almost Blank Subframe (NZP ABS) in which signals are transmitted at a lower transmission power than a transmission power of a normal subframe on downlink.

If the CRS is present within the symbol, the information about the data transmission power may be determined such that the data transmission power within the symbol is set to zero.

In a further aspect of the present invention, provided herein is an eNB configured to transmit a downlink signal to a User Equipment (UE), including a Radio Frequency (RF) unit configured to transmit or receive a radio signal; and a processor configured to control the RF unit, wherein the processor is configured to transmit information about a data transmission power within an OFDM symbol in a data region of a downlink subframe to the UE, wherein the information about the data transmission power is determined according to a specific condition and the specific condition includes at least one of whether a Cell-specific Reference Signal (CRS) is present within the symbol and a modulation scheme or a Modulation and Coding Scheme (MCS) of the symbol, and wherein the downlink subframe is a Non-Zero Power Almost Blank Subframe (NZP ABS) in which signals are transmitted at a lower transmission power than a transmission power of a normal subframe on downlink.

If the CRS is present within the symbol, the information about the data transmission power may be determined such that the data transmission power within the symbol is set to zero.

If the CRS is present within the symbol and the modulation scheme or the MCS does not permit the lower transmission power, the information about the data transmission power may be determined such that the data transmission power within the symbol is set to zero.

In a still another aspect of the present invention, provided herein a User Equipment (UE) configured to receive a downlink signal, including a Radio Frequency (RF) unit configured to transmit or receive a radio signal; and a processor configured to control the RF unit, wherein the processor is configured to receive information about a data transmission power within an OFDM symbol in a data region of a downlink subframe from an eNB through the RF unit and demodulate a downlink data signal in the downlink subframe based on the information about the data transmission power, wherein the information about the data transmission power is determined according to a specific condition and the specific condition includes at least one of presence/absence of a Cell-specific Reference Signal (CRS) within the symbol and a modulation scheme or a Modulation and Coding Scheme (MCS) of the symbol, and wherein the downlink subframe is a Non-Zero Power Almost Blank Subframe (NZP ABS) in which signals are transmitted at a lower transmission power than a transmission power of a normal subframe on downlink.

The above solutions are just parts of embodiments of the present invention and various embodiments into which the technical features of this invention are incorporated can be derived and understood by those skilled in the art based on the detailed description of the present invention which follows.

Advantageous Effects of Invention

According to at least one embodiment of the present invention, a method and apparatus for supporting data demodulation of a UE is provided when intercell interference exists and ICIC is performed, thereby improving demodulation performance of the UE that receives data on downlink even if a transmission power of a downlink subframe dynamically varies. In addition, a method and apparatus for supporting interference elimination performance proposed according to an embodiment of the present invention can improve interference elimination capability caused by a downlink subframe.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
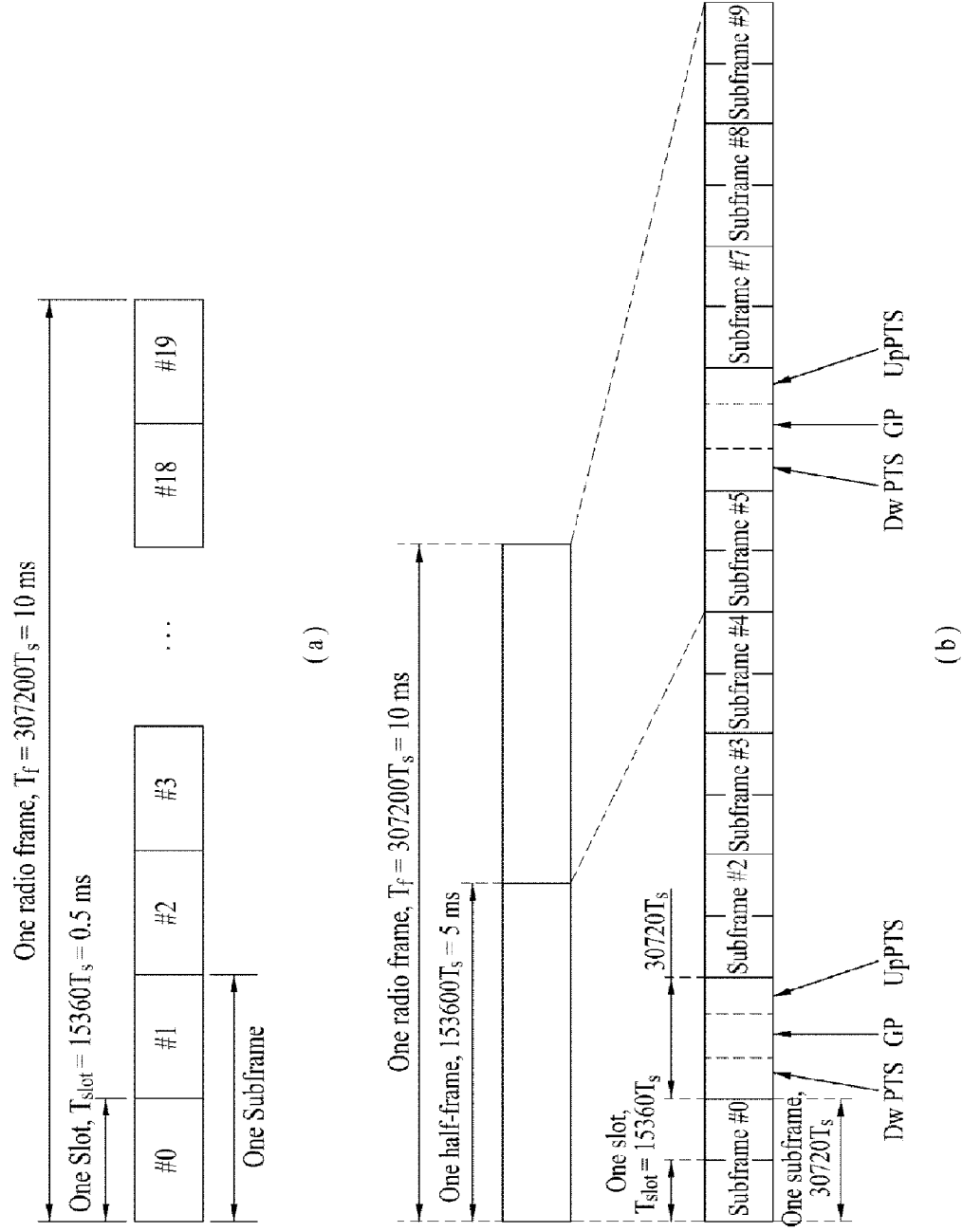
FIG. 1 shows the structure of a radio frame used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms (307200?Ts) and includes 10 subframes with the same size. The 10 subframes of the radio frame may be numbered. Ts denotes sampling time, and is represented by Ts=1/(2048*15 kHz). Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
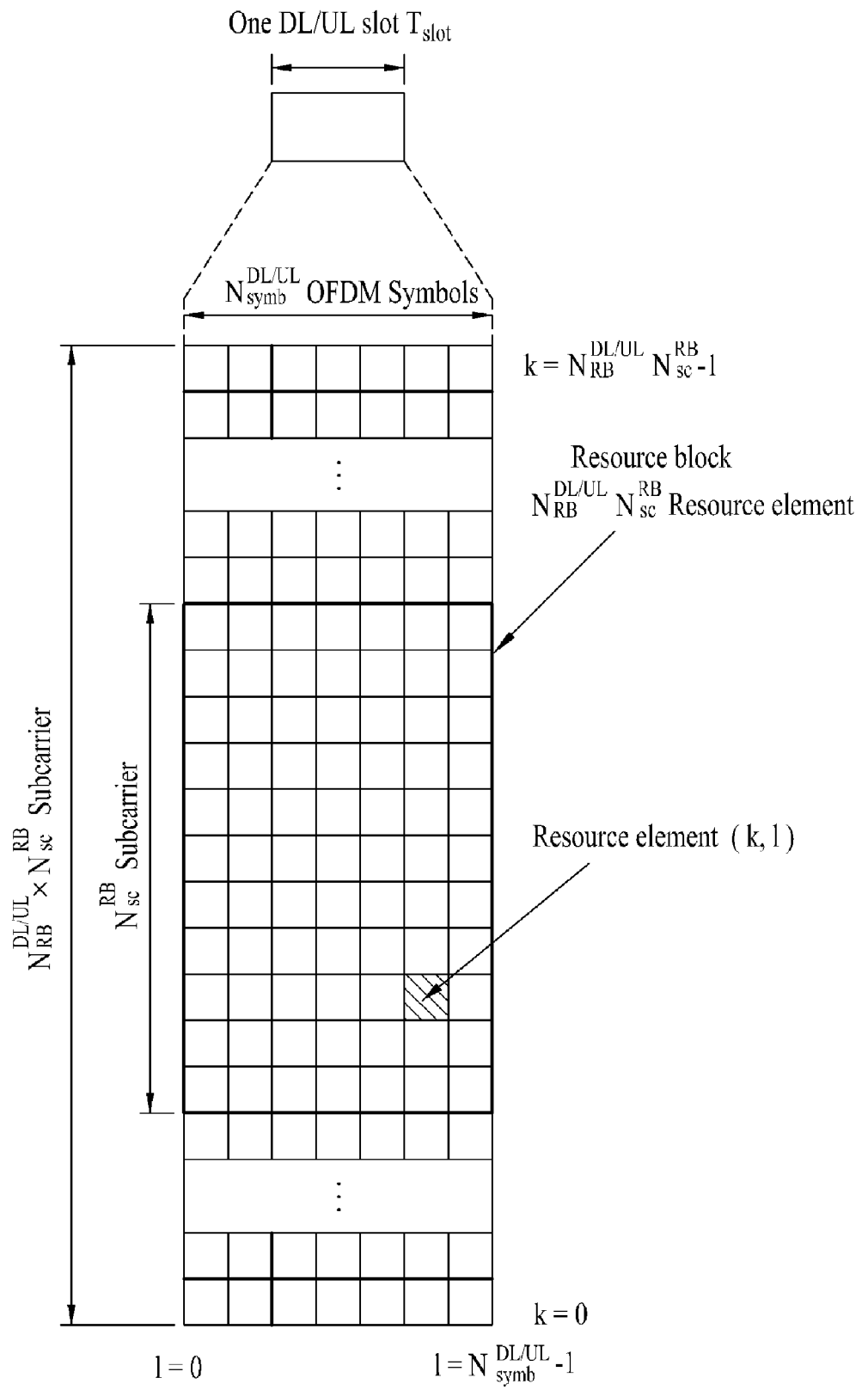
FIG. 2 shows the structure of a downlink/uplink slot in a radio communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB}*N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index applied from 0 to $N^{DL/UL}_{RB}*N^{RB}_{sc}-1$ in a frequency domain, and l is an index from 0 to $N^{DL/UL}_{symb}-1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB}=n_{VRB}$. The localized VRBs are numbered from 0 to $N^{DL}_{VRB}-1$ and $N^{DL}_{VRB}=N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
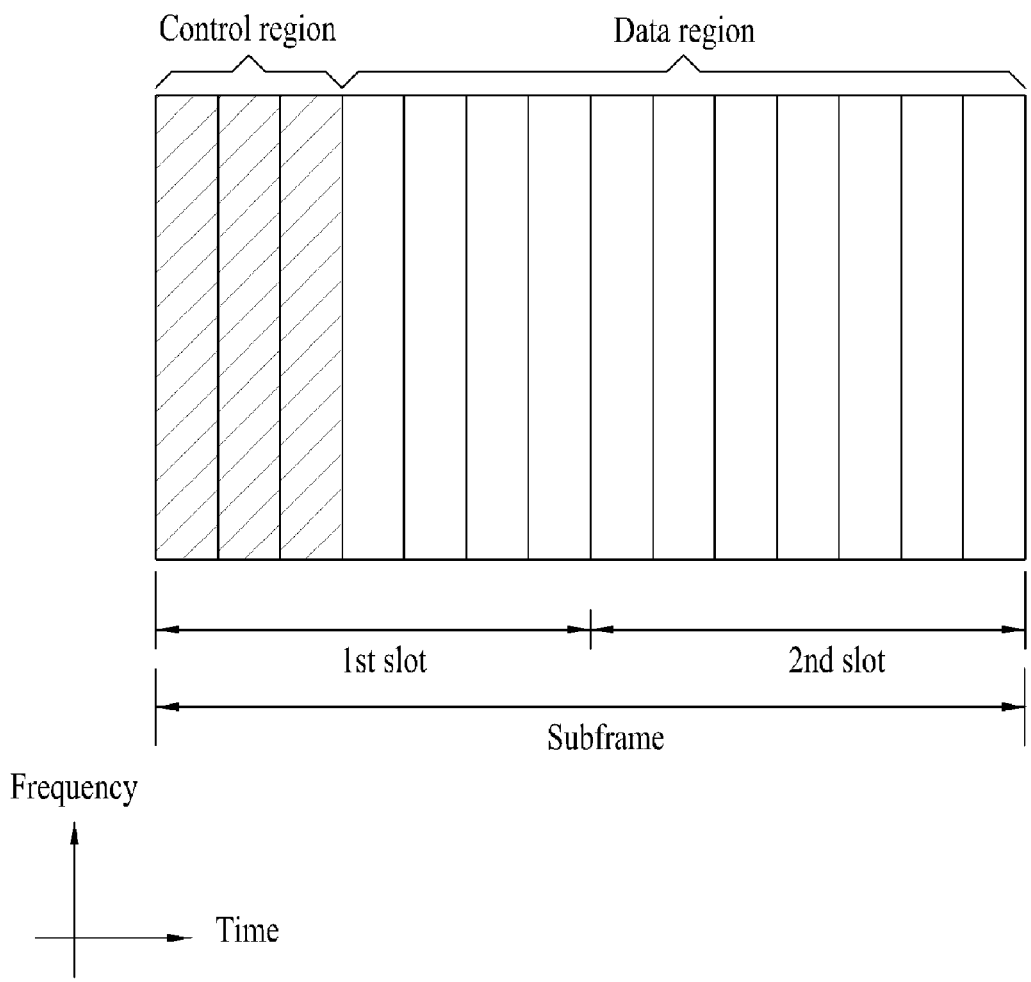
FIG. 3 shows the structure of a downlink subframe used in an 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
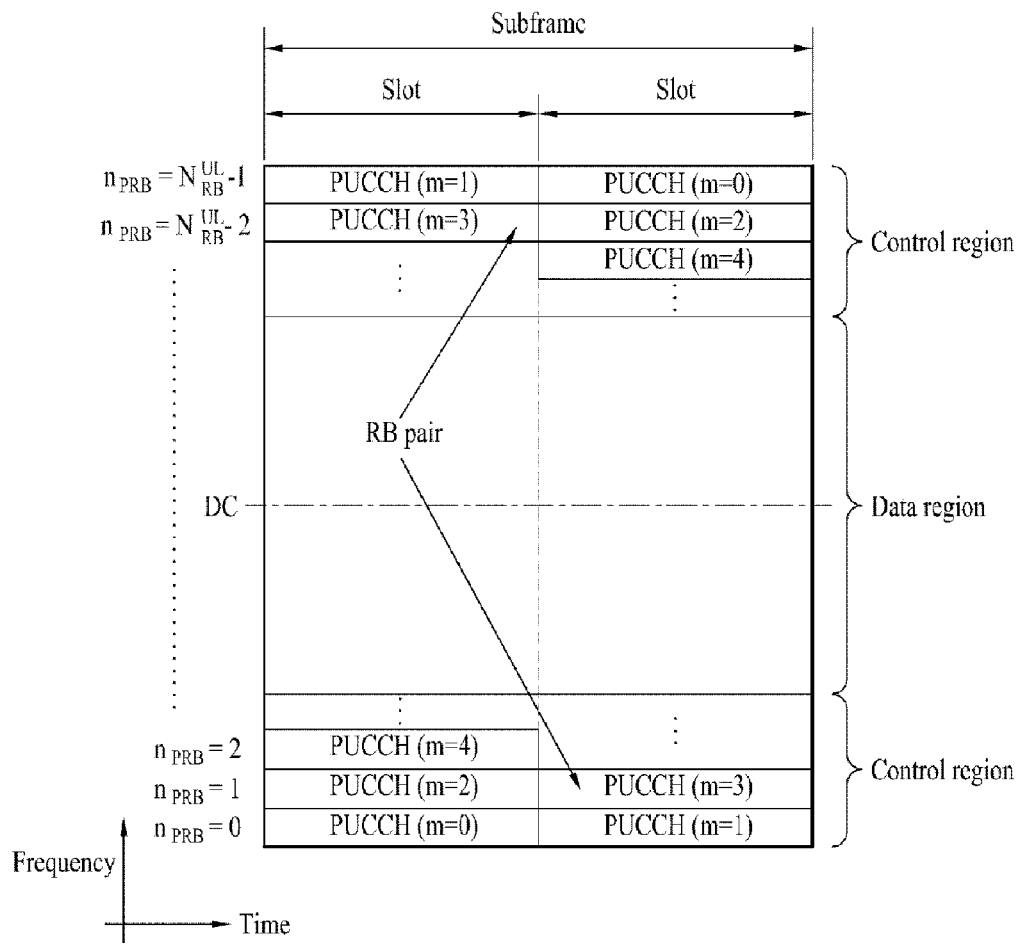
FIG. 4 shows the structure of an uplink subframe used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

Table 2

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK orSR + ACK/NACK | One codeword |
| 1b | QPSK | 2 | ACK/NACK orSR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK orSR + ACK/NACK orCQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

Figure 5:
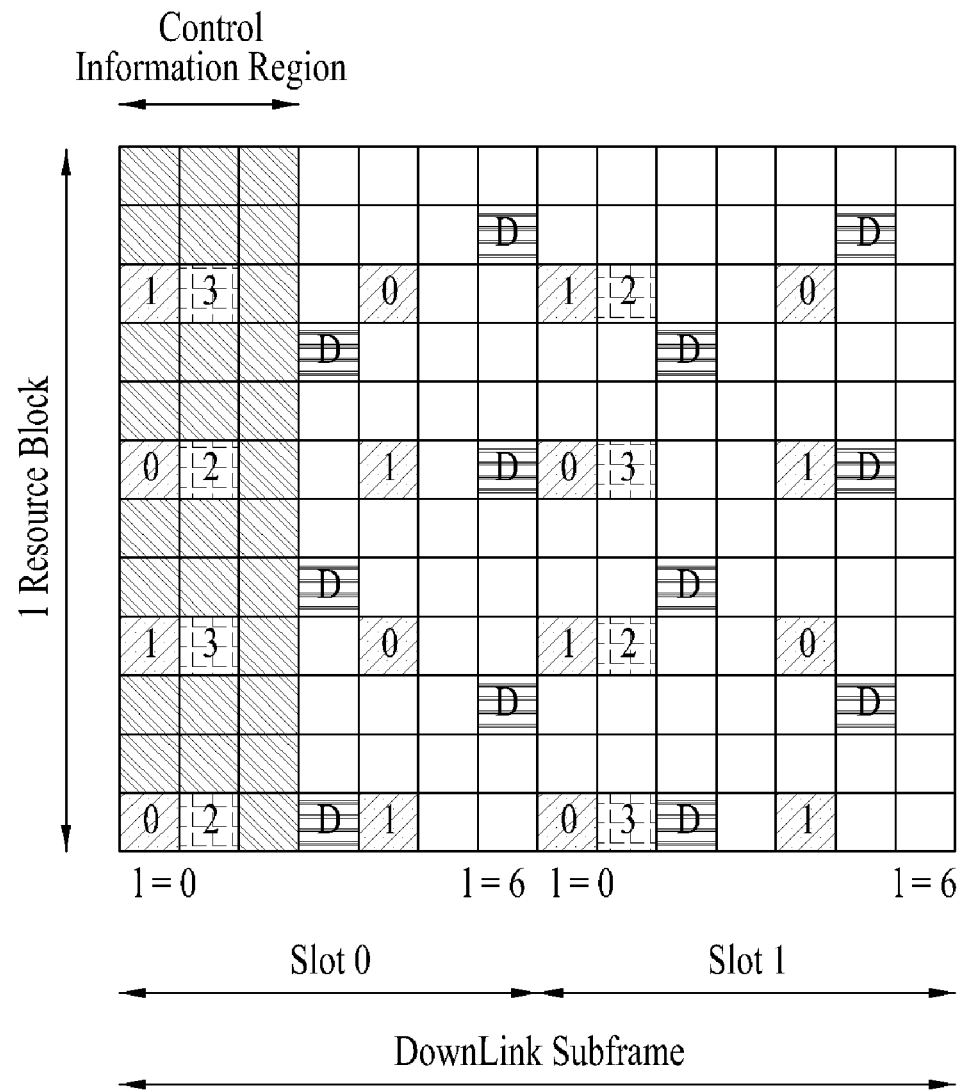
FIGS. 5 and 6 show CRS and DRS patterns defined in a legacy 3GPP LTE system.
Figure 6:
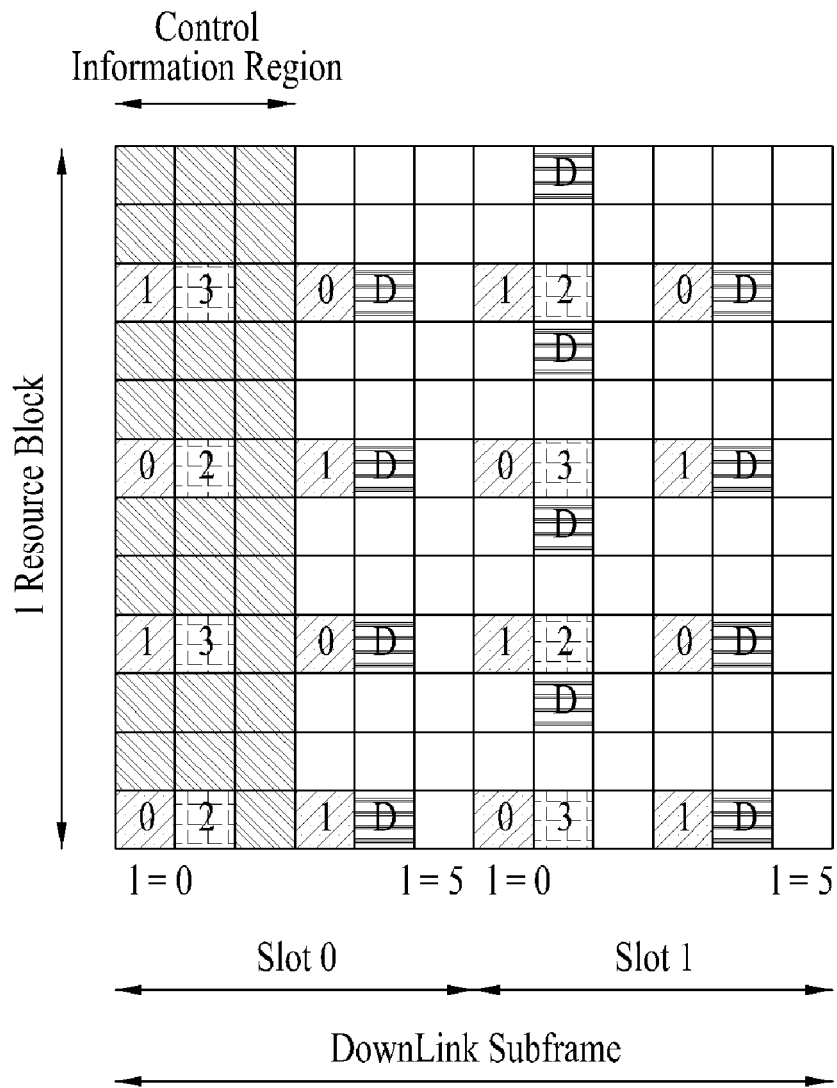

FIGS. 5 and 6 show CRS and DRS patterns mapped onto a downlink RB pair, defined in a legacy 3GPP LTE system (e.g. Release-8). A downlink RB pair as an RS mapping unit may be expressed in units of one subframe in the time domain and 12 subcarriers in the frequency domain. That is, one RB pair has a length of 14 OFDM symbols in a normal Cyclic Prefix (CP) (FIG. 5) and a length of 12 OFDM symbols in an extended CP (FIG. 6) in the time domain.

Prior to description of FIGS. 5 and 6, an RS will now be described.

Reference Signal (RS)

When packets are transmitted in a wireless communication system, the packets are transmitted through a radio channel and thus signal distortion may occur during a signal transmission process. To correctly receive the distorted signal at a reception side, distortion of the received signal should be corrected using channel information. To detect the channel information, a method of transmitting a signal, of which both the transmission side and the reception side are aware to detect the channel information using a distortion degree when the signal is received through a channel is mainly used. The above signal is referred to as a pilot signal or an RS.

When a signal is transmitted and received using multiple antennas, the receiving side should discern a channel state between each transmission antenna and each receive antenna to correctly receive the signal. Accordingly, an additional RS should be present per transmission antenna.

A downlink RS includes a Common Reference Signal (CRS) shared among all UEs in a cell and a Dedicated Reference Signal (DRS) for a specific UE only. It is possible to provide information for channel estimation and demodulation using such RSs.

The reception side (UE) may estimate the channel state from the CRS and feed back an indicator associated with channel quality, such as a Channel Quality Indicator (CQI), a Precoding Matrix Index (PMI) and/or a Rank Indicator (RI), to the transmission side (eNB). The CRS may also be called a cell-specific RS. Alternatively, an RS associated with feedback of Channel State Information (CSI) such as CQI/PMI/RI may be separately defined as a CSI-RS.

The DRS may be transmitted through corresponding REs if data demodulation on a PDSCH is necessary. The UE may receive information about the presence/absence of the DRS from a higher layer and receive information indicating that the DRS is valid only when the PDSCH is mapped. The DRS may also be called a UE-specific RS or a Demodulation Reference Signal (DMRS).

FIGS. 5 and 6 show the locations of RSs on an RB pair in a system in which an eNB supports four transmission antennas. In FIGS. 5 and 6, REs denoted by '0', '1', '2' and '3' indicate the locations of CRSs of antenna port indexes 0, 1, 2 and 3, respectively. In FIGS. 5 and 6, an RE denoted by 'D' indicates the location of a DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNB). The 3GPP LTE (e.g. Release-8) system supports various antenna configurations and a downlink signal transmission side (eNB) has three types of antenna configuration such as a single antenna, two transmission antennas, and four transmission antennas. If the eNB performs single-antenna transmission, RSs for a single antenna port are arranged. If the eNB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNB performs four-antenna transmission, RSs for four antenna ports are arranged using the TDM/FDM scheme. Channel information estimated by the downlink signal reception side (UE) through the CRSs may be used to demodulate data transmitted using a transmission scheme such as single antenna transmission, transmission diversity, closed-loop spatial multiplexing, open-loop spatial multiplexing, or Multi-User Multiple Input Multiple Output (MU-MIMO).

In the time domain, RSs are arranged starting from a symbol index (1=0) of each slot at a constant interval. The time interval is differently defined according to CP length. The RSs are located on symbol indexes 0 and 4 of the slot in the case of a normal CP and are located on symbol indexes 0 and 3 of the slot in the case of an extended CP. Only RSs for a maximum of two antenna ports are defined in one OFDM symbol. Accordingly, upon four-transmission antenna transmission, the RSs for antenna ports 0 and 1 are located within the symbol indexes 0 and 4 (the symbol indexes 0 and 3 in case of the extended CP) of the slot and the RSs for antenna ports 2 and 3 are located within the symbol index 1 of the slot. The frequency locations of the RSs for the antenna ports 2 and 3 are exchanged with each other in the second slot.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transport channel and the precoding weight transmitted from each transmission antenna are combined, when the UE receives the RSs.

A legacy 3GPP LTE system (e.g. Release-8) supports a maximum of four-transmission antenna transmission and defines a DRS for Rank 1 beamforming. The DRS for Rank 1 beamforming is also denoted by an RS for an antenna port index 5.

In an LTE-Advanced (LTE-A) system which is an evolved version of the 3GPP LTE system, high-order MIMO, multi-cell transmission, evolved MU-MIMO, or the like is considered. To support efficient RS management and an evolved transmission scheme, DRS-based data demodulation is considered. That is, separately from the DRS (antenna port index 5) for Rank 1 beamforming defined in the legacy 3GPP LTE (e.g. Release-8) system, DRSs for two or more layers may be defined in order to support data transmission through an added antenna.

Intercell Interference Reduction

If two eNBs (eNB1 and eNB2) are contiguously arranged such that partial coverage of the two eNBs overlaps, a UE served by one eNB may be subjected to interference by a strong downlink signal from the other eNB. For example, if a micro eNB (eNB2) is located within coverage of a macro eNB (eNB1), a UE (UE2) served by the micro eNB (eNB2) may be subjected to interference by a signal from the macro eNB (eNB1). If intercell interference is generated as stated above, the two eNBs may reduce intercell interference through intercell cooperation.

In various exemplary embodiments of the present invention which will be described hereinbelow, it is assumed that signals are smoothly transmitted and received between two eNBs that cause interference and are subjected to interference.

For example, it is assumed that a wired/wireless link (e.g. backhaul link or Un interface) in which a transmission condition, such as transmission bandwidth or time delay, between two eNBs is good is present and thus reliability for transmission and reception of a cooperation signal between the eNBs is high.

It is also assumed that time synchronization between two eNBs is matched within a permissible error range (e.g. the case in which boundaries between downlink subframes of two eNBs that cause interference and are subjected to interference are aligned) and the two eNBs definitely recognize an offset of subframe boundaries between the two eNBs.

For example, eNB1 may be a macro eNB providing a service with a high transmission power to a wide area and eNB2 may be a micro eNB (e.g. pico eNB) providing a service with a low transmission power to a narrow area. If the UE (UE2) that is located in a cell boundary area of eNB2 and is served by eNB2 is subjected to strong interference from eNB1, it may be difficult to perform effective communication without proper inter-cell cooperation.

Especially, there is a high possibility that such intercell interference occurs in a situation in which many UEs are connected to the micro eNB (eNB2) having a low power to disperse load caused by service provision of the macro eNB (eNB1).

For example, if the UE desires to select a serving eNB, receive powers of downlink signals from respective eNBs may be calculated and compared using a scheme of adding a prescribed adjustment value (bias value) to the receive power from the micro eNB and not adding the adjustment value to the receive power from the macro eNB and, as a result, the UE may select an eNB providing a higher downlink receive power as the serving eNB. Accordingly, it is possible to connect more UEs to the micro eNB.

Although the strength of a downlink signal received by the UE from the macro eNB is much stronger than that received from the micro eNB, the micro eNB may be selected as the serving eNB and thus the UE connected to the micro eNB may be subjected to strong interference from the macro eNB. In this case, UEs located at the boundary of the micro eNB may have difficulty performing correct operation due to strong interference from the macro eNB unless additional intercell cooperation is provided.

Meanwhile, such occurrence of intercell interference is purely exemplary and it is apparent that embodiments described in the present invention are identically applicable to situations different from the above case, (e.g. the case in which the micro eNB causes interference and the macro eNB is subjected to interference or the case in which intercell interference occurs between micro eNBs or between macro eNBs).

Figure 7:
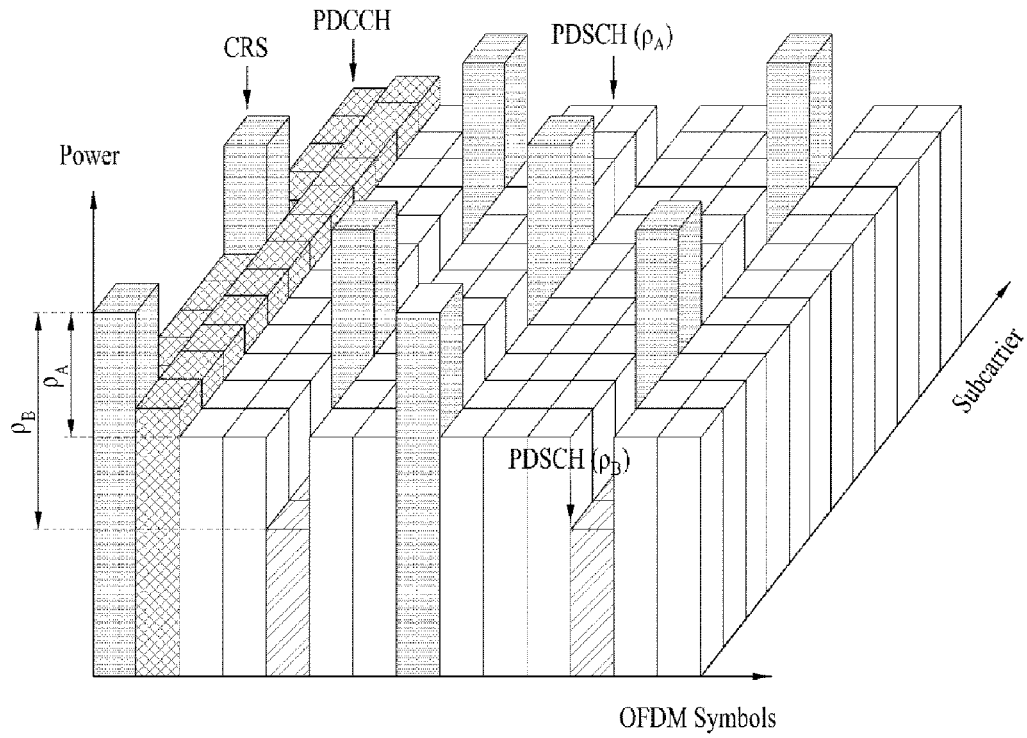
FIG. 7 shows an exemplary embodiment of power allocation to each resource element included in a downlink subframe.

In a wireless communication system such as 3GPP LTE, an Energy Per Resource Element (EPRE) indicating an energy value of each RE is defined for transmission power allocation of a downlink resource. FIG. 7 shows an exemplary embodiment of power allocation to each RE included in a downlink subframe.

In FIG. 7, X axis, Y axis, and Z axis denote an OFDM symbol, a subcarrier, and a transmission power, respectively.

An eNB determines transmission power allocation of a downlink resource as an energy value of each RE. The transmission power allocation of the downlink resource is determined based on an EPRE for a CRS and an EPRE for a resource region of a PDSCH on which data is actually transmitted is expressed in the ratio to an EPRE of the CRS.

For example, the ratio of the EPRE of the PDSCH to the EPRE of the CRS in an OFDM symbol duration in which the CRS is not present in a downlink subframe in the time domain is defined as $\rho_A$ and the ratio of the EPRE of the PDSCH to the EPRE of the CRS in an OFDM symbol duration in which the CRS is present in a downlink subframe in the time domain is defined as $\rho_B$.

At this time, $\rho_A$ may be determined by a power offset $\delta_{power\text{-}offset}$ according to whether an MU-MIMO transmission structure is applied and by a UE-$\delta_{power\text{-}offset}$ may be given as 0 dB for all PDSCH transmission schemes except for MU-MIMO and the UE-specific parameter $P_A$ may be signaled to the UE by a higher layer. $\rho_B/\rho_A$ may be determined by the number of antenna ports which are cell-specifically configured and a cell-specific parameter $P_B$ which is signaled by the higher layer and may be given as shown in Table 3 below.

TABLE 3

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Meanwhile, a dynamic range of a transmission power for each RE in an LTE wireless communication system, etc. may be limited as shown in Table 4 according to requirements on a radio frequency (e.g. Error Vector Magnitude (EVM) and out-of-band emission).

TABLE 4

| Modulation scheme used | RE power control dynamic range (dB) | |
|---|---|---|
| on the RE | (down) | (up) |
| QPSK (PDCCH) | −6 | −4 |
| QPSK (PDSCH) | −6 | −3 |
| 16QAM (PDSCH) | −3 | −3 |
| 64QAM (PDSCH) | 0 | 0 |

Table 4 shows an example of a dynamic range of RE transmission power control according to a modulation scheme of an E-UTRA eNB. The dynamic range of transmission power control for RE indicates a difference between a transmission power for each RE and an average transmission power for REs when an eNB transmits data at a maximum transmission power under a specified reference condition. The transmission power of an RE may be restricted by requirements for out-of-band emission, requirements for an EVM, and the like. Here, out-of-band emission is one form of unwanted emission and refers to emission on a frequency immediately outside a bandwidth of a channel as a result of non-linearity of a modulation process and a transmitter. The EVM refers to a difference between an ideal symbol and a measured symbol after quantization and this difference is called an error vector. The EVM is defined as a square root of the ratio of a mean reference power to a mean error vector power and may be expressed in percent.

The dynamic range of a transmission power for each RE of Table 4 may be determined by an upper limit (up) and a lower limit (down) of the transmission power for each RE based on the transmission power for each RE when an eNB transmits a signal at a maximum transmission power under a specified reference condition. Specifically, the upper limit of the transmission power for each RE may be determined by requirements for out-of-band emission according to non-linearity of the above-described modulation process and transmitter. The lower limit of the transmission power for each RE may be determined by requirements for the above-described EVM.

Accordingly, in an environment shown in Table 4, the transmission power of a specific subframe (e.g. NZP-ABS) may be restricted by the lower limit of Table 4. In this case, power allocation for the resource of a downlink subframe, determined by $\rho_A$ and $\rho_B$ in a normal downlink subframe transmitted through higher layer signaling from the eNB to the UE may be ineffective in a specific subframe (e.g. NZP-ABS).

Figure 8:
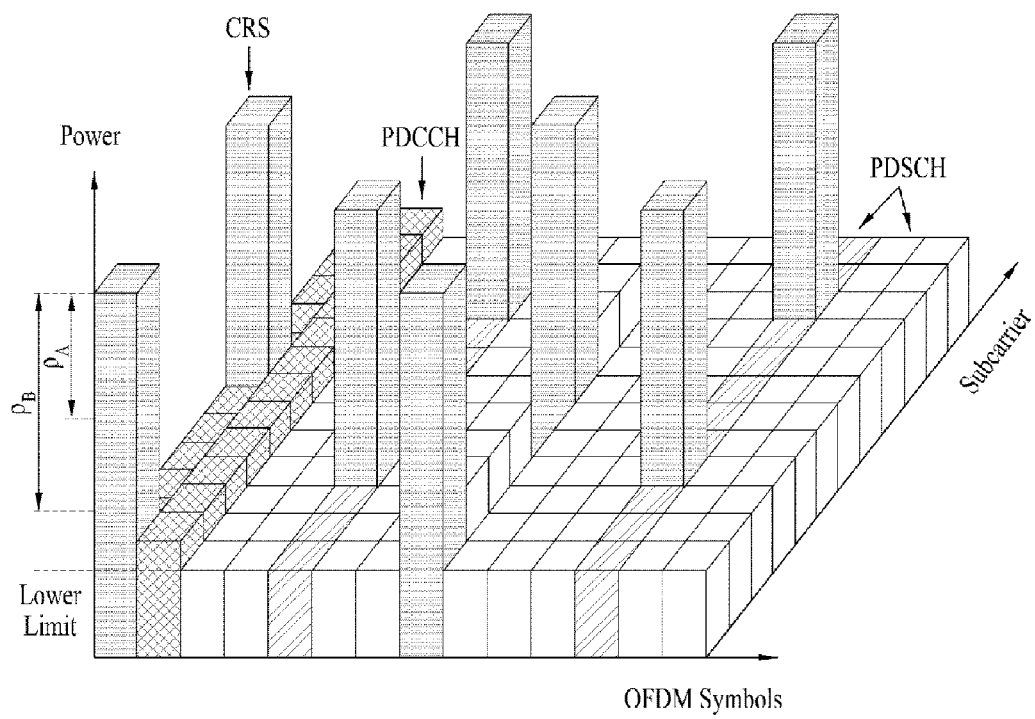
FIG. 8 shows another exemplary embodiment of power allocation to each resource element included in a downlink subframe.

FIG. 8 shows another exemplary embodiment of power allocation to each RE included in a downlink subframe in an environment shown in Table 4. In FIG. 8, X axis, Y axis, and Z axis denote an OFDM symbol, a subcarrier, and a transmission power, respectively.

As shown in FIG. 8, when eNB1 transmits a specific subframe (e.g. NZP-ABS) to the UE by allocating the transmission power for each RE according to the lower limit of the transmission power dynamic range, the actual ratio of the EPRE of a PDSCH to the EPRE of a CRS in a specific subframe (e.g. NZP-ABS) measured by the UE may be different from the ratio ($\rho_B/\rho_A \neq 1$) of transmission power allocation to the specific subframe (e.g. NZP-ABS) transmitted to the UE through higher layer signaling, which may affect measurement and/or downlink data demodulation of the UE.

Accordingly, in order for the UE to correctly demodulate data transmitted on a certain subframe, the UE needs to receive transmission power information applied to the corresponding subframe from the eNB. Specifically, the UE needs to receive information indicating which subframe among downlink subframes is configured as a specific subframe (e.g. NZP-ABS) and transmission power information of the specific subframe from the eNB.

In addition, if the eNB (eNB1) which causes interference configures a specific subframe (e.g. NZP-ABS) among downlink subframes, interference caused by eNB1 varies with the pattern of the specific subframe and the transmission power of the specific frame. Therefore, the eNB (eNB2) that is subjected to interference may determine a subframe (i.e. a measurement subframe) in which measurement is to be performed by the UE served by eNB2, using the information indicating which subframe among downlink subframes of eNB1 causing interference is configured as a specific subframe and the transmission power information of the specific subframe (e.g. NZP-ABS) and may control intercell interference by performing restricted measurement in the subframe in which measurement is to be performed. To this end, eNB2 needs to receive the information indicating a specific subframe (e.g. NZP ABS) and the transmission power information of the specific subframe from eNB1. Here, the restricted measurement means that resources through which the UE performs measurement are limited to partial resources and the resources through which the UE performs measurement may indicate specific resources of the time and/or frequency domain.

Namely, the UE served by eNB2 may perform accurate downlink measurement and accurate data demodulation, using the information indicating a subframe (i.e. measurement resources) in which measurement is to be performed and the transmission power information of the subframe in which measurement is to be performed.

Accordingly, eNB1 may transmit the information indicating a specific subframe (e.g. NZP ABS) among downlink subframes of eNB1 and the transmission power information of the specific subframe (e.g. NZP ABS) to eNB2 through an X2 interface and eNB2 may configure a resource (e.g. subframe) in which measurement is to be performed by the UE so that the UE served thereby can perform limited measurement using the information indicating the specific subframe (e.g. NZP ABS) and the transmission power information of the specific subframe (e.g. NZP ABS) received from eNB1. Accordingly, eNB2 needs to transmit the information indicating the resource (e.g. subframe) through which measurement is to be performed by the UE and/or the transmission power information of the resource (e.g. subframe) through which measurement is to be performed by the UE to the UE through higher layer signaling.

Here, CSI measurement may indicate performing CSI measurement using an RS (e.g. CSI-RS) transmitted in a subframe in which measurement is to be performed by the UE. Specifically, CSI measurement may include measurement and/or calculation of a CQI, a PMI, a Precoding Type Indicator (PTI), and/or an RI.

ICIC may be performed in a frequency resource and/or a time resource. An exemplary embodiment of ICIC may use a scheme in which eNB1 does not perform transmission in a specific resource region, for the UE connected to eNB2 (i.e. including a scheme in which eNB1 transmits a null signal, eNB1 is silenced, or eNB1 transmits a signal at zero power). Here, the specific resource region in which silencing is performed may be expressed as a time resource and/or frequency resource.

For example, the location of a silenced time resource may be determined by one or more combinations of a whole time domain, a specific subframe, a specific slot, and a specific OFDM symbol. The location of a silenced frequency resource may be determined by one or more combinations of a whole frequency band, a specific subcarrier (in case of carrier aggregation using a plurality of carriers), a specific RB, and a specific subcarrier. Therefore, a resource region in which silencing is performed can be surely specified.

For convenience of description, it is assumed that a specific resource in which silencing is performed is determined in units of a subframe. However, the range of the present invention is not limited thereto and the principle described in the present invention may be identically applied to operation of performing silencing in a specific time resource and/or a specific frequency resource between a cell (eNB1) that causes interference and a cell (eNB2) that is subjected to interference.

ICIC for the time resource will now be described. For example, ICIC for the time resource in a 3GPP LTE (release-10) wireless communication system may be performed by dividing the time resource into a plurality of subframes and using information as to whether a silencing operation or reduced power transmission is performed in each subframe. That is, ICIC for the time resource refers to cooperation between the cell (eNB1) that causes interference and the cell (eNB2) that is subjected to interference as to how a subframe is used. Information about the silencing operation in each subframe or the transmission power information may be transmitted and received through a link between eNB1 and eNB2.

Hereinafter, a silencing operation in which eNB1 does not perform transmission in a specific resource region for the UE connected to eNB2 will be described as an exemplary embodiment of ICIC.

As an example of the silencing operation, eNB1 may configure a specific subframe as a Multicast-Broadcast Single Frequency Network (MBSFN) subframe. In a downlink subframe configured as the MBSFN subframe, a signal is transmitted only in a control region and is not transmitted in a data region.

As another example of the silencing operation, eNB1 may configure a specific subframe as a specific Almost Blank Subframe (ABS) or an ABS-with-MBSFN. The ABS refers to a subframe in which a signal is transmitted at a transmission power lower than a transmission power of a normal subframe.

For example, the ABS may mean a subframe in which only a CRS is transmitted and other control information and data are not transmitted in a control region and a data region of a downlink subframe. Nonetheless, downlink channels and downlink signals such as a Physical Broadcast Channel (PBCH), a Primary Synchronization Signal (PSS), and a Secondary Synchronization Signal (SSS) may be transmitted even in the ABS. The ABS-with-MBSFN may mean a subframe in which even the CRS is not transmitted in the data region of the above-described ABS.

Furthermore, the present invention proposes that the ABS be divided into a zero power ABS (z-ABS) in which data (or a PDSCH signal) is not transmitted in the data region of the downlink subframe and a Non-Zero Power (NZP) ABS in which data (or a PDSCH signal) is transmitted in the data region of a downlink subframe at a very low transmission power. Meanwhile, in this disclosure, the NZP ABS may have the same meaning as a reduced-ABS (r-ABS).

Specifically, it is proposed to provide a method for raising system throughput by enabling a UE served by eNB1 to receive data even in the ABS. Moreover, it is proposed that eNB2 effectively control intercell interference affecting a UE served thereby using information related to the NZP ABS from eNB1.

Embodiment 1

The present invention proposes a method for restricting a dynamic range of a transmission power of a downlink resource in an NZP ABS and efficiently using new power allocation information in the NZP ABS according to restriction of the transmission power, during NZP ABS transmission for the purpose of ICIC in a multi-cell wireless communication environment in which intercell interference occurs. The power allocation information in the NZP ABS may be transmitted to a UE that receives data through the NZP ABS so as to be used for data demodulation and may be transmitted to the UE that is subjected to interference from the NZP ABS so as to be used for interference elimination. As an exemplary embodiment of the present invention, a method is proposed of informing a UE of new power allocation information about a transmission time of a specific subframe such as an NZP ABS, when ratios $\rho_A$ and $\rho_B$ of a PDSCH EPRE to a CRS EPRE are determined by a UE-specific parameter $P_A$ and a cell-specific parameter $P_B$, respectively, in downlink power allocation of a 3GPP LTE system.

Embodiment 1-1

A method is described for informing a UE of transmission power information for a specific downlink subframe without depending on a conventional power allocation scheme according to an exemplary embodiment of the present invention. It is assumed that transmission powers of downlink resources for a normal subframe in an LTE system are configured as $\rho_A$ and $\rho_B$ which are ratios of a CRS EPRE to a PDSCH EPRE. In this case, a PDSCH in an NZP ABS transmits data at a lower transmission power than a PDSCH in the normal subframe. Accordingly, to detect the data, a UE receiving the corresponding data should recognize that a power allocation scheme of the NZP ABS is different from a conventional scheme. The present invention proposes a method for informing the UE of indication information about the specific downlink subframe such as the NZP ABS without depending on the conventional power allocation scheme. In this case, an eNB may inform the UE of presence/absence of the NZP ABS through a higher layer signal by a bitmap scheme or inform the UE by defining a specific NZP-ABS pattern by a semi-periodic scheme. For example, when a time-domain ICIC scheme is applied, if the eNB informs the UE of a new power allocation scheme for the NZP-ABS, the eNB may inform the UE of information about a subframe in which the power allocation scheme is applied in the time domain by the bitmap scheme.

Embodiment 1-2

A method is described for informing the UE of a UE-specific parameter and a system restriction condition as additional power allocation information for the specific subframe such as the NZP ABS according to an exemplary embodiment of the present invention. $P_A$ and $P_B$ which are parameters for determining power allocation for a normal subframe defined in the LTE system are invalid in the specific subframe such as the NZP ABS. Accordingly, it is necessary to transmit additional information about power allocation in the NZP ABS. At this time, $\rho_B$ depends on $\rho_A$ according to the cell-specific parameter $P_B$ determining $\rho_B/\rho_A$ and $\rho_A$ is determined by the UE-specific parameter $P_A$. Therefore, the present invention propose a method for informing the UE of a new UE-specific parameter $P_A$ as power allocation information about the NZP ABS and informing the UE of a restriction condition of a system according to use of the NZP ABS beforehand. $P_A$ determines $\rho'_A$ which is the ratio of a PDSCH EPRE to a CRS EPRE for an OFDM symbol having no CRS in the NZP ABS and the cell-specific parameter $P_B$ is reused. As an example, a power allocation scheme in the NZP ABS is calculated according to $P_A$ and $P_B$ and the system restriction condition is applied to the calculated value to detect a final power allocation value. $P_A$ and the system restriction condition may be transmitted to the UE through a higher layer signal such as RRC.

Embodiment 1-3

As a further exemplary embodiment, a method of calculating $\rho'_A$ is described. A specific example of $\rho'_A$ for allocating a downlink transmission power in the NZP ABS according to operation proposed in the present invention is described based on an LTE system. In the LTE system (i.e. Release-10), $\rho_A$ is differently defined with respect to two cases. First, during PDSCH data transmission applying a transmission diversity scheme using four cell-common antenna ports, $\rho_A$ is determined by the following Equation (Math FIG. 1.

MathFigure 1

$$\rho_A = \beta_{power\text{-}offset} + P_A + 10 \log_{10}(2) \text{ [dB]} \qquad \text{[Math.1]}$$

where $\delta_{power\text{-}offset}$ denotes a power offset value for supporting an MU-MIMO operation and is set to 0 dB during PDSCH transmission except for MIMO operation. $P_A$ indicates the UE-specific parameter as described above. For cases except for the above-mentioned transmission diversity based PDSCH transmission, $\rho_A$ is defined as the following Equation 2.

MathFigure 2

$$\rho_A = \delta_{power\text{-}offset} + P_A \text{ [dB]} \qquad \text{[Math.2]}$$

Meanwhile, when the new UE-specific parameter $P_A$ for the NZP ABS is applied according to the operation proposed in the present invention, Equation 1 and Equation 2 may be modified to Equation 3 and Equation 4, respectively, so as to be applied to downlink transmission power allocation in the NZP ABS.

MathFigure 3

$$\rho'_A = \delta_{power\text{-}offset} + P'_A + 10 \log_{10}(2) \text{ [dB]} \qquad \text{[Math.3]}$$

MathFigure 4

$$\rho'_A = \delta_{power\text{-}offset} + P'_A \text{ [dB]} \qquad \text{[Math.4]}$$

Embodiment 2

According to another exemplary embodiment of the present invention, a method is described for informing the UE of power offset information $\delta_{power\text{-}offset}$ and a system restriction condition as additional power allocation information for a specific subframe such as an NZP ABS. As stated above, the downlink power allocation scheme of the LTE system depends mainly on $\rho_A$ and $\rho_A$ is influenced by the power offset information $\delta_{power\text{-}offset}$ in addition to the UE-specific parameter $P_A$. In a subframe configured as an ABS, $\delta_{power\text{-}offset}$ is set to 0 [dB] or −3 [dB] according to whether MU-MIMO is applied. The present invention proposes a method for informing the UE of $\delta_{power\text{-}offset}$ to be used as power allocation information for the NZP ABS and previously informing the UE of a system restriction condition according to use of the NZP ABS while maintaining $P_A$ and $P_B$ conforming to the conventional power allocation scheme. As an example, the UE calculates a power allocations scheme in the NZP ABS according to $\rho_A$ newly determined by $\delta_{power\text{-}offset}$ of the NZP ABS and the conventional cell-specific parameter $P_B$ determining $\rho_B/\rho_A$ and applies the system restriction condition to the resultant value, thereby determining a final power allocation value. In this case, the power offset information $\delta_{power\text{-}offset}$ of the NZP ABS and system restriction condition may be transmitted to the UE through a higher layer signal such as RRC.

Embodiment 2-1

As another exemplary embodiment, a method of calculating is described. According to the operation of the present invention, may be defined by Equation 5 and Equation 6.

MathFigure 5

$$\rho'_A = \delta_{power\text{-}offset} + P_A + 10\log_{10}(2)\ [\text{dB}] \quad [\text{Math.5}]$$

MathFigure 6

$$\rho'_A = \delta_{power\text{-}offset} + P_A\ [\text{dB}] \quad [\text{Math.6}]$$

If $\delta_{power\text{-}offset}$ of the NZP ABS is set to X [dB] through a higher layer signal such as RRC, $\delta_{power\text{-}offset}$ in a subframe (i.e. normal subframe) rather than in an ABS is 0 [dB] or $-10*\log_{10}(2)$ [dB] according to whether MU-MIMO is applied and $\delta_{power\text{-}offset}$ in the NZP ABS is X [dB] or $X-10*\log_{10}(2)$ [dB] according to whether MU-MIMO is applied.

Embodiment 3

According to an exemplary embodiment of the present invention, a method is described for informing the UE of power offset information $\delta_{rp\text{-}offset}$ and a system restriction condition as additional power allocation information for a specific subframe such as an NZP ABS. As an example, the UE calculates a power allocation scheme in the NZP ABS according to $\rho_A$ newly determined by $\delta_{rp\text{-}offset}$ of the NZP ABS and the conventional cell-specific parameter $P_B$ for determining $\rho_B/\rho_A$ and applies the system restriction condition to the resultant value, thereby determining a final power allocation value. In this case, the power offset information $\delta_{rp\text{-}offset}$ of the NZP ABS and system restriction condition may be transmitted to the UE through a higher layer signal such as RRC.

Embodiment 3-1

As another exemplary embodiment, a method for calculating $\rho'_A$ is described. According to the operation of the present invention, $\rho'_A$ may be defined by Equation 7 and Equation 8. If the additional power allocation information $\delta_{rp\text{-}offset}$ proposed in the present invention is considered, Equation 5 and Equation 6 may be modified to Equation 7 and Equation 8, respectively.

MathFigure 7

$$\rho'_A = \delta_{power\text{-}offset} + \delta_{rp\text{-}offset} + P_A + 10\log_{10}(2)\ [\text{dB}] \quad [\text{Math.7}]$$

MathFigure 8

$$\rho'_A = \delta_{power\text{-}offset} + \delta_{rp\text{-}offset} + P_A\ [\text{dB}] \quad [\text{Math.8}]$$

where $P_A$ may be replaced with a new UE-specific parameter $P_A'$ defined in the present invention. According to the exemplary embodiment of the present invention, a method is described for informing the UE of the UE-specific parameter $P_A$ and the subframe-specific parameter $P_B$ as the additional power allocation information for the specific subframe such as the NZP ABS. Separately from the parameters $P_A$ and $P_B$ for determining power allocation for a normal subframe defined in the LTE system, parameters $P_A'$ and $P_B'$ for the NZP ABS may be defined. The UE-specific parameter $P_A'$ determines $\rho'_A$ which is the ratio of a PDSCH EPRE to a CRS EPRE for an OFDM symbol without a CRS in the NZP ABS and the subframe-specific parameter $P_B'$ determines $\rho'_B/\rho'_A$ in the NZP ABS.

$\rho'_B$ refers to the ratio of a PDSCH EPRE to a CRS EPRE for an OFDM symbol with the CRS in the NZP ABS. The new parameters enable the power allocation scheme for the specific subframe such as the NZP ABS to be flexibly set. As an example, in FIG. 8, the UE-specific parameter $P_A'$ may be set to a low power value according to the NZP ABS and the subframe-specific parameter $P_B'$ may be set to a fixed value to satisfy $\rho'_B/\rho'_A = 1$.

$P_A'$ and $P_B'$ may be transmitted to the UE through a higher layer signal such as RRC and $\rho'_B/\rho'_A$ may be shared in offline as a table for $P_B'$ and an antenna port similarly to the conventional scheme. $P_A'$ and $P_B'$ may be transmitted in the form extended from $P_A$ and $P_B$.

Embodiment 4

Hereinafter, a method for applying a transmission power restriction condition of a system as shown in Table 4 to calculate a final power allocation value in the NZP ABS will be described.

As a first method, power allocation in the NZP ABS is calculated from the above described methods and the restriction condition per modulation scheme of Table 4 is applied to detect the final power allocation value. Alternatively, similarly to Table 4, the eNB may inform the UE of the restriction condition per modulation scheme through a higher layer signal such as RRC or may be scheduled between the eNB and the UE in advance in offline. The restriction condition indicates a minimum value $\rho'_{B,min}$ of $\rho'_B$ which is the ratio of a PDSCH EPRE to a CRS EPRE for an OFDM symbol with a CRS in the NZP ABS per modulation scheme, for example, $\rho'_{B,min,QPSK}$, $\rho'_{B,min,16QAM}$, and $\rho'_{B,min,64QAM}$.

The UE calculates $\rho'_B$ in the NZP ABS using the above-described methods and is assigned a modulation scheme of a corresponding PDSCH from control information in a PDCCH indicating PDSCH transmission in the corresponding NZP ABS. Then, the UE demodulates data of the PDSCH by applying the larger of $\rho'_{B,min}$ and $\rho'_B$ of the corresponding modulation scheme.

As a second method, power allocation in the NZP ABS is calculated according to the above-described method and, if the restriction condition per modulation scheme is not satisfied, data is not transmitted to the PDSCH on the OFDM symbol including the CRS. In this scheme, the UE calculates $\rho'_B$ in the NZP ABS and is assigned a modulation scheme of the corresponding PDSCH from control information in the PDCCH indicating PDSCH transmission in the corresponding NZP ABS. If $\rho'_{B,min}$ of the corresponding modulation scheme is greater than $\rho'_B$, the UE determines that data has not been transmitted on an OFDM symbol with the CRS in the PDSCH.

In the first and second proposed methods, the restriction condition per Modulation and Coding Scheme (MCS) may be designated through a more detailed scheme by replacing the restriction scheme per modulation scheme with a restriction condition per MCS.

As a third method, power allocation in the NZP is calculated from the above methods and no data is transmitted on an OFDM symbol with a CRS in a data region of a corresponding subframe in a specific modulation scheme (or MCS level). In this method, the UE calculates $\rho'_A$ and $\rho'_B$ in the NZP ABS and is assigned an MCS of a corresponding PDSCH from control information in a PDCCH indicating PDSCH transmission in the corresponding NZP ABS. If the corresponding modulation scheme (or MCS level) is a specific modulation scheme (or MCS level), the UE determines that no data has been transmitted through the PDSCH on the OFDM symbol with the CRS.

As an additional proposed scheme, in order to reduce distortion during a transmission power variable duration generated by a severe difference between the OFDM symbol with the CRS and the OFDM without the CRS in the NZP ABS, $\rho'_C$ for the ratio of a PDSCH EPRE to a CRS EPRE in an OFDM symbol adjacent to the OFDM symbol with the CRS is defined and the eNB informs the UE of $\rho'_C$.

In this method, the UE demodulates the PDSCH using the fact that PDSCH transmission powers in the NZP ABS are defined as $\rho'_A$, $\rho'_B$ and $\rho'_C$ defined on the OFDM symbol without the CRS, the OFDM symbol with the CRS, and the OFDM symbol adjacent to the OFDM symbol with the CRS, respectively. In a specific modulation scheme (or MCS level), no data is transmitted through the PDSCH on the OFDM symbol with the CRS and on the OFDM symbol adjacent to the OFDM symbol with the CRS.

Embodiment 5

As another exemplary embodiment of the present invention, a method is proposed for informing the UE of additional power allocation information for the specific subframe such as the NZP ABS, for example, the UE-specific parameter $P_A$ and the subframe-specific parameter $P_B$. The parameters $P_A$ and $P_B$ for determining power allocation for a normal subframe, parameters $P_A'$ and $P_B'$ for the NZP ABS separate from $\Delta_{offset}$ and $\Delta'_{offset}$ are defined and should be signaled to the UE. Information about a subframe to which these parameters (e.g. subframe pattern) is also signaled.

$\Delta_{offset}$ is used for outer-loop target control for CSI feedback and Adaptive Modulation and Coding (AMC). Since transmission power values vary with subframes, a different $\Delta'_{offset}$ per subframe is desirably signaled and applied.

Embodiment 5-1

According to an exemplary embodiment of the present invention, a method is described for informing a neighboring cell of additional power allocation information for a specific subframe such as an NZP ABS. When a specific eNB performs ABS transmission in the LTE system, the system supports signal transmission for informing a neighboring cell of information about an ABS transmission pattern of the eNB in order to raise the efficiency of an ICIC scheme. Although the information about the ABS transmission pattern may be sufficient for a Z-ABS in which no data is transmitted, it may be insufficient for the NZP ABS in which data of a low transmission power is transmitted. Accordingly, the present invention proposes a method for informing a neighboring cell influenced by interference of information about the transmission power of the NZP ABS when NZP ABS transmission is performed. In this case, as the information about the transmission power of the NZP ABS, the difference with an existing transmission power may be signaled in terms of an average power and, when necessary, information about each symbol transmission power (e.g. $P_A'$ and $P_B'$) may be signaled. The information about the transmission power of the NZP ABS may be transmitted through a backhaul network between eNBs. The information about the transmission power of the NZP ABS may be used when a UE that is subjected to interference from the NZP ABS applies an interference elimination scheme. For example, a Minimum Mean Square Error (MMSE) receiver may be applied in consideration of interference magnitude according to the NZP ABS per symbol.

Embodiment 5-2

According to an exemplary embodiment of the present invention, a method for transmitting a signal for distinguishing between a z-ABS and an NZP ABS to a UE or a neighboring cell is described. The present invention proposes a method for indicating independent pattern information in order to distinguish between the existing z-ABS and the NZP ABS. For example, individual bitmap information of each pattern of the z-ABS and the NZP ABS in the time domain may be signaled, or a new Relative Narrow Transmission Power (RNTP) having a threshold value different from an existing RNTP may be defined in order to indicate whether the NZP ABS is present. When necessary, the bitmap information and the new RNTP may be combined to indicate whether the NZP ABS is present, in terms of two dimensions of the time domain and the frequency domain. Information indicating whether the NZP ABS is present may be transmitted to a UE or neighboring cell receiving data from the NZP ABS and the NZP ABS pattern and the RNTP having the new threshold value may be transmitted through a higher layer signal.

Embodiment 5-3

According to an exemplary embodiment of the present invention, a method is described for a UE receiving data in the NZP ABS to restrict a range of quantizing a received signal in consideration of the magnitude of interference of a neighboring cell. Upon receiving data in the NZP ABS, the UE may receive an interference signal much stronger than a signal received thereby from a neighboring cell. Accordingly, when the UE receiving data from the NZP ABS quantizes a received signal using an Analog-to-Digital Converter (ADC), a method may be considered in which the UE performs quantization within a power range corresponding to the NZP ABS thereof by excluding the other regions to reduce interference. The present invention proposes a method for excluding a region which can be recognized as an interference signal in the process of quantizing a received signal to a digital signal, when the received signal of the UE is much weaker than an interference signal of a neighboring cell due to the structure of the NZP ABS. As an example, the interference signal may be excluded by limiting the range of minimum and maximum values in a linear quantization process or a compander may be used.

Embodiment 6

To describe an additional operation of the present invention, it is assumed that each of a macro eNB and a pico eNB operates and the macro eNB transmits the NZP ABS to support Cell Range Expansion (CRE) for the pico eNB as one a further enhanced ICIC (FeICIC) scheme. Meanwhile, on an OFDM symbol including a CRS, the CRS may cause interference between symbols due to a nonlinear property of physical implementation. Accordingly, in an LTE Release-11 system, a method is considered in which an available transmission power reduction range on an OFDM symbol with a CRS in the NZP ABS is set differently from an available transmission power reduction range on an OFDM symbol without the CRS in the NZP ABS. For example, the macro eNB may provide a higher transmission power within the OFDM symbol with the CRS in the NZP ABS than a transmission power within the OFDM symbol without the CRS in the NZP ABS or may not transmit data within the OFDM symbol with the CRS in the NZP ABS. Hereinafter, the additional operation of the present invention will be described by distinguishing between the above two cases.

Embodiment 6-1

Case in which the OFDM symbol with the CRS has a higher transmission power than the OFDM symbol without the CRS in the NZP ABS.

As the additional operation according to an exemplary embodiment of the present invention, a method is proposed for transmitting transmission power information extended to support a difference in an available transmission power per OFDM symbol group according to whether the CRS is present in the NZP CRS. In the LTE Release-10 system, downlink transmission power allocation information is defined as the ratio of a CRS EPRE to a PDSCH EPRE in the case in which the CRS is not present within the OFDM symbol (e.g.

$\rho_A$)

and in the case in which the CRS is present within the OFDM symbol (e.g.

$\rho_B$).

The UE-specific parameter $P_A$ defined by a signal actually transmitted to the UE and $\delta_{power-offset}$ for correcting MU-MIMO operation determine a value of $\rho_A$ and the cell-specific parameter $P_B$ indicates information about $\rho_B/\rho_A$ according to the number of antenna ports. As an example, the transmission power allocation information according to $P_B$ in the LTE RE1-10 system is defined as shown in the above-described Table 3.

As can be seen from Table 3, a transmission power within the OFDM symbol without the CRS is higher than a transmission power within the OFDM symbol with the CRS in a normal subframe. However, as assumed in the exemplary embodiment of the present invention, a transmission power within the OFDM symbol with the CRS in the NZP ABS may be set to be higher than a transmission power within the OFDM symbol without the CRS in the NZP ABS due to restriction of physical implementation as opposed to the normal subframe. Accordingly, it is necessary to support a transmission power range in the NZP ABS different from a transmission power range in the normal subframe with respect to $\rho'_A$ which is the ratio of a CRS EPRE to a PDSCH EPRE on the OFDM symbol without the CRS and $\rho'_B$ which is the ratio of a CRS EPRE to a PDSCH EPRE on the OFDM symbol with the CRS in the NZP ABS. For example, when $P_A'$ and $P_B'$ defined for the NZP ABS in the operation of the present invention are used, the range of values of $P_A'$ can be extended to support further reduction of a transmission power and $P_B'$ may use a new table defined such that a transmission power within the symbol with the CRS in the NZP ABS may have a greater value than a transmission power within the symbol without the CRS. Accordingly, the present invention proposes a method for frame-specifically changing the range of values indicated by $P_A'$ and $P_B'$.

Embodiment 6-1-1

As an additional operation according to an exemplary embodiment of the present invention, a method is proposed for transmitting information for rate matching or puncturing for an OFDM symbol with a CRS in an NZP ABS to a UE (or a pico UE) that is subjected to interference from the NZP ABS. As mentioned above, a difference in a transmission power per OFDM symbol group may occur according to whether the CRS is present in the NZP ABS during NZP ABS transmission. As an example, the UE that is subjected to interference from the NZP ABS may receive a stronger interference signal within the OFDM symbol with the CRS in the NZP ABS than within the OFDM symbol without the CRS in the NZP ABS. At this time, a rate matching or puncturing operation for enhancing the performance of the UE influenced by interference from the NZP ABS in the above environment may be considered. In other words, an eNB may perform rate matching for downlink subframes except for the OFDM symbol with the CRS in the NZP ABS which may cause interference or perform puncturing for the OFDM symbol. The present invention proposes a method for informing the UE influenced by interference from the NZP ABS of rate matching information applied to the NZP ABS or puncturing information to be performed by the UE. For example, the rate matching information or puncturing information may include location information of the OFDM symbol with the CRS in the NZP ABS which causes relatively high interference or include available RE information for data transmission. To reduce interference from the NZP ABS, REs available to the UE to which rate matching or puncturing is applied differ from REs in a normal subframe and thus a new Transport Block Size (TBS) value should be defined. As one example, a method for reusing an existing TDD special subframe TBS may be considered. In addition, when rate matching is applied to the UE influenced by the NZP ABS, a transmission power of a data RE on the OFDM symbol with the CRS in a subframe in which data of the UE is transmitted is 0. In this case, $\rho_B$ may be determined by newly adding a value of $P_B=0$ or transmission power information $\rho''_B$ (e.g.

$\rho''_B=0$)

for the OFDM symbol without the CRS may be directly signaled.

Embodiment 6-1-2

As an additional operation according to an exemplary embodiment of the present invention, a method for calculating CSI considering the number of available REs is proposed when a rate matching or puncturing scheme is applied to a UE influenced by interference from the NZP ABS. When the UE influenced by interference from the NZP ABS uses information about an OFDM symbol location causing high interference in the NZP ABS or rate matching and puncturing related information, more accurate CSI can be calculated or data modulation performance can be improved. For instance, the above information may be used in a CSI calculation process to select an MCS.

Embodiment 6-2

Case in which no data is transmitted in a PDSCH region on the OFDM symbol with the CRS in the NZP ABS As an additional operation according to an exemplary embodiment of the present invention, a method for determining whether to transmit data on the OFDM symbol with the CRS in the NZP ABS is proposed according to a specific transmission condition such as an MCS level, etc. According to the exemplary embodiment of the present invention, when the OFDM symbol with the CRS in the NZP ABS may cause high interference to a pico UE etc., a no-data transmission method within the OFDM symbol with the CRS in the NZP ABS may be considered. In other words, all data transmission powers within the OFDM symbols in the NZP ABS may be set to 0. At this time, if a data RE transmission power within the OFDM symbol with the CRS in the NZP ABS is determined by a specific transmission condition such as an MCS level, whether to transmit data within the OFDM symbol with the CRS in the NZP ABS may be determined according to the MCS level.

For example, 16 QAM on the OFDM symbol with the CRS in the NZP ABS or a more modulation scheme (e.g. 64 QAM) may not set a transmission power to be sufficiently low due to reception performance deterioration. Accordingly, in order to reduce the amount of interference in this case, data may not be transmitted within the OFDM symbol with the CRS in the NZP ABS (i.e. a transmission power of the corresponding symbol is 0). Meanwhile, if QPSK is applied to the OFDM symbol with the CRS in the NZP ABS, a transmission power is set to be sufficiently low and data can be transmitted at the set low power on the OFDM symbol with the CRS in the NZP ABS.

Embodiment 6-2-1

As an additional operation according to an exemplary embodiment of the present invention, a method is proposed for informing the UE of rate matching or puncturing related information for a specific resource region causing high interference in the NZP ABS in terms of a UE receiving data in the NZP ABS. As described above, the method in which no data is transmitted within the OFDM symbol with the CRS in the NZP ABS may be considered. Rate matching or puncturing may be applied to the UE receiving data from the NZP ABS and related information should be transmitted to the corresponding UE to perform correct data demodulation. If rate matching is applied, a new TBS should be defined. In addition, if rate matching is applied to the UE receiving data from the NZP ABS, a transmission power of a data RE within the OFDM symbol with the CRS in the NZP ABS becomes 0. In this case, $\rho'_B$ may be determined by transmitting $P_B'=0$ or $\rho'_B$ may be directly signaled.

Embodiment 6-2-2

As an additional operation according to an exemplary embodiment of the present invention, a method is proposed for calculating CSI in consideration of available REs when a rate matching or puncturing scheme is applied to a UE receiving data from the NZP ABS. The UE receiving data from the NZP ABS may calculate the number of REs available thereto using the rate matching and puncturing relation information and can calculate CSI by selecting a more proper MCS. The number of REs available to the UE receiving data from the NAP ABS may differ according to a modulation scheme (e.g. QAM or PSK) and the UE should calculate CSI in consideration of available REs.

Embodiment 6-3

Case applied to both Embodiment 6-1 and Embodiment 6-2

As an additional operation according to an exemplary embodiment of the present invention, a method is proposed for informing a UE of a correction value for Interference Measurement (IM) in the OFDM symbol with the CRS in the NZP ABS, when the UE influenced by interference from the NZP ABS in a CRS non-collision environment. There may be a big difference in interference generated from the NZP ABS between the OFDM symbol without the CRS in the NZP ABS and the OFDM symbol with the CRS in the NZP ABS. For example, assuming that a transmission power within the OFDM symbol with the CRS in the NZP ABS is greater than a transmission power of the OFDM symbol without the CRS in the NZP ABS, if a UE influenced by interference from the NZP ABS performs CRS based IM, only a high strength of interference signal within the OFDM symbol with the CRS in the NZP ABS is measured and thus an influence of interference by a neighboring cell may be overestimated. Alternatively, when a data transmission power of the OFDM symbol with the CRS in the NZP ABS is set to 0, if the UE influenced by interference from the NZP ABS performs CRS based IM, an influenced of interference may be underestimated. Accordingly, IM in the UE influenced by interference from the NZP ABS should be corrected using the transmission power allocation information of the NZP ABS. As information about the transmission power of the NZP ABS, both $\rho'_A$ for the OFDM symbol without the CRS in the NZP ABS and $\rho'_B$ for the OFDM symbol with the CRS in the NZP ABS may be transmitted or only the ratio of $\rho'_A$ to $\rho'_B$ may be transmitted. If the number of CRS ports transmitted to the UE performing IM is greater than the number of CRS ports in the NZP ABS, correction is performed only on the OFDM symbol with the CRS in the NZP ABS. If the NZP ABS is configured as an MBSFN ABS, additional correction is not necessary.

Embodiment 6-3-1

As an additional operation according to an exemplary embodiment of the present invention, a method is proposed for independently setting a transmission power between the OFDM symbol without the CRS in the NZP ABS and the OFDM symbol with the CRS in the NZP ABS during NZP ABS transmission, an MCS level, and outer-loop target control related information for selecting a CQI index. In the exemplary embodiment of the present invention, it is assumed that rate matching or puncturing is applied in order for the UE influenced by interference from the NZP ABS to avoid interference from the OFDM symbol with the CRS in the NZP ABS. In this case, there is no need to restrict the transmission power and MCS level of the OFDM symbol with the CRS in the NZP ABS in terms of the NZP ABS. Accordingly, the present invention proposes a method for separately setting the transmission power and MCS level of the OFDM symbol with the CRS in the NZP ABS from those of the OFDM symbol without the CRS in the NZP ABS, when the UE influenced by interference from the NZP ABS performs rate matching or puncturing for the OFDM symbol with the CRS in the NZP ABS. Meanwhile, in the LTE Release-10 system according to the exemplary embodiment of the present invention, an outer-loop target control operation may be performed based on information such as a data reception error in a network for the purpose of correcting a CQI index transmitted by the UE. For example, $\rho_A$ for CSI calculation may be corrected through $\Delta_{offset}$ as indicated by Equation 9 and Equation 10.

MathFigure 9

$$\rho_A = P_A + \Delta_{offset} + 10 \log_{10}(2) [dB] \quad \text{[Math.9]}$$

MathFigure 10

$$\rho_A = P_A + \Delta_{offset} [dB] \quad \text{[Math.10]}$$

However, if the transmission powers and MCS levels within the OFDM symbol with the CRS in the NAP ABS and within the OFDM symbol without the CRS in the NAP ABS are separately managed, it is necessary to apply different outer-loop target control per symbol group. For example, offset values for performing outer-loop target control for each of $\rho'_A$ and $\rho'_B$ may be set to $\Delta_{offset,A}$ and $\Delta_{offset,B}$.

If $\rho'_B$ and $\rho'_A$ are determined by $P_B'$ an additional correction equation should be considered. If the transmission power allocation information $\rho'_B$ in the OFDM symbol with the CRS corresponds to a specific condition such as an MCS level, a correction value such as $\Delta_{offset,B}$ may be directly applied to a transmission power allocation value according to a corresponding MCS level.

Figure 9:
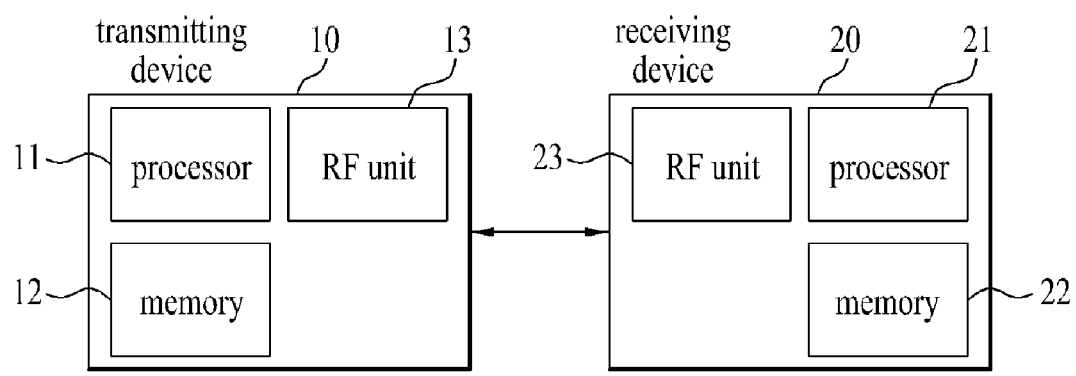
FIG. 9 is a block diagram of devices configured to perform operation according to the exemplary embodiments of the present invention.

FIG. 9 is a block diagram of devices configured to perform operation according to the exemplary embodiments of the present invention.

A transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device or the receiving device. The processors 11 and 21 may perform various control functions to perform the present invention. The processors 11 and 21 may be called controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmission antennas.

A signal processing process of the receiving device 20 is the reverse of the signal processing process of the transmitting device 10. Under the control of the processor 21, the RF unit 23 of the receiving device 10 receives radio signals transmitted by the transmitting device 10. The RF unit 23 may include Nr (where Nr is a positive integer) receive antennas and frequency down-converts each of signals received through receive antennas into a baseband signal. The RF unit 23 may include an oscillator for frequency down-conversion. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted in correspondence to a corresponding antenna defines an antenna viewed from the receiving device 20 and enables the receiving device 20 to perform channel estimation for the antenna, irrespective of whether a channel is a single radio channel from one physical channel or a composite channel from a plurality of physical antennas including the antenna. That is, an antenna is defined such that a channel for transmitting a symbol on the antenna can be derived from the channel through which another symbol on the same antenna is transmitted. In case of an RF unit for supporting a MIMO function of transmitting and receiving data using a plurality of antennas may be connected to two or more antennas.

In the exemplary embodiments of the present invention, a UE or relay operates as the transmitting device 10 on uplink and as the receiving device 20 on downlink. In the exemplary embodiments of the present invention, a BS operates as the receiving device 20 on uplink and as the transmitting device 10 on downlink.

Hereinafter, to describe the exemplary embodiments of the present invention, a processor, a memory, an RF unit included in the BS will be referred to as a BS processor, a BS memory, and a BS RF unit, respectively. Further, a processor, a memory, and an RF unit included in the UE will be referred to as a UE processor, a UE memory, and a UE RF unit, respectively. In the present invention, the BS processor may be a processor located in the BS or may be a BS controller connected to a cable or a dedicated line with the BS to control the BS.

The BS processor may be configured to determine information about a data transmission power within an OFDM symbol in a data region of a downlink subframe according to a specific condition and transmit the information about the determined data transmission power to the UE through the RF unit. The specific condition may include at least one of whether a CRS is present within the symbol, a modulation scheme of the symbol, and an MCS. The downlink subframe may include an NZP ABS in which signals are transmitted at a transmission power $P_{ABS}$ lower than a transmission power of a normal subframe on downlink.

The BS processor may be configured to determine the information about the data transmission power such that a data transmission power of the symbol becomes zero when a CRS is present in the symbol. If the CRS is present in the symbol and the modulation scheme or MCS does not permit the reduced transmission power $P_{ABS}$ (that is, the reduced transmission power is not available due to a reception distortion or a quality of service (SOC) in a receiving end), the BS processor may be configured to determine the information about the data transmission power such that the data transmission power of the symbol becomes zero.

The BS processor may be configured to transmit, to a UE in a neighboring cell, at least one of the transmission power information, information about rate matching performed for the subframe, and information about puncturing performed for the subframe. If the UE in the neighboring cell (hereinafter, a neighboring UE) is subjected to interference due to the subframe, the neighboring UE may perform IM based on the rate matching or puncturing information or may avoid interference based on the rate matching or puncturing information.

The information about the data transmission power may include a UE-specific parameter $P_A'$ for the subframe, a subframe-specific parameter $P_B'$ and power transmission offset information $\delta_{power\text{-}offset}$ and may also include additional power offset information $\delta_{rp\text{-}offset}$ as described earlier.

The BS processor may transmit indication information for the NZP ABS to the UE. The indication information may be information indicating an NZP ABS pattern or bitmap information indicating whether the NZP ABS is present.

The BS processor may be configured to receive the information about the data transmission power of the OFDM symbol in the data region of the downlink subframe determined according to a specific condition through the BS RF unit and demodulate the PDSCH based on the information about the data transmission power.

In this way, interference of a UE belonging to a neighboring cell influenced by interference due to the downlink subframe can be controlled by determining the information about the data transmission power of the OFDM symbol in the data region of the downlink subframe (or NZP ABS). In an environment in which intercell interference control is applied, PDSCH demodulation performance can be improved by transmitting the information about the transmission power to a UE intended to receive the downlink subframe.

The above-described detailed configuration of the transmitting device and receiving device corresponding to the BS and UE may be implemented such that items described in the various embodiments of the present invention are independently applied or two or more embodiments are simultaneously applied and repetitive parts are omitted for clarity.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments described in this disclosure may be used for a BS, a UE, or other equipment in a wireless communication system.

The invention claimed is:

1. A method for determining transmission power information of a downlink subframe, comprising:
   transmitting information about a data transmission power of OFDM (orthogonal frequency division multiplexing) symbols in a data region of the downlink subframe to a User Equipment (UE),
   wherein the information about the data transmission power is determined according to a specific condition and the specific condition includes at least one of whether a Cell-specific Reference Signal (CRS) is present within each of the OFDM symbols or a modulation scheme or a Modulation and Coding Scheme (MCS) of each of the OFDM symbols, and
   wherein the downlink subframe is a Non-Zero Power Almost Blank Subframe (NZP ABS) in which signals are transmitted at a lower transmission power than a transmission power in a normal subframe on downlink, and
   wherein, if the CRS is present within at least one of the OFDM symbols and the modulation scheme or the MCS does not permit the lower transmission power, the data transmission power of the at least one of the OFDM symbols is set to zero.

2. The method according to claim 1, further comprising: providing at least one of the information about the transmission power information and information about rate matching or puncturing performed for the subframe with a UE in a neighboring cell.

3. The method according to claim 1, further comprising: providing at least one of the information about the transmission power information and information about rate matching or puncturing performed for the subframe with the UE which is intended to receive the downlink signal.

4. The method according to claim 1, wherein the information about the data transmission power is determined based on a transmission power of the CRS.

5. The method according to claim 1, wherein the information about the data transmission power includes a UE-specific parameter for the subframe, a subframe-specific parameter, and transmission power offset information.

6. The method according to claim 1, further comprising: transmitting indication information about the NZP ABS to the UE, and
   wherein the indication information is information indicating a pattern of the NZP ABS or bitmap information indicating whether the NZP ABS is present.

7. A method for receiving a downlink signal by a User Equipment (UE), comprising:
   receiving information about a data transmission power of OFDM (orthogonal frequency division multiplexing) symbols in a data region of a downlink subframe and demodulating a downlink data signal in the downlink subframe based on the information about the data transmission power,
   wherein the information about the data transmission power is determined according to a specific condition and the specific condition includes at least one of whether a Cell-specific Reference Signal (CRS) is present within each of the OFDM symbols or a modulation scheme or a Modulation and Coding Scheme (MCS) of each of the OFDM symbols, and
   wherein the downlink subframe is a Non-Zero Power Almost Blank Subframe (NZP ABS) in which signals are transmitted at a lower transmission power than a transmission power in a normal subframe on downlink, and
   wherein, if the CRS is present within at least one of the OFDM symbols and the modulation scheme or the MCS does not permit the lower transmission power, the data transmission power of the at least one of the OFDM symbols is set to zero.

8. An eNB configured to transmit a downlink signal to a User Equipment (UE), comprising:
   a Radio Frequency (RF) unit configured to transmit or receive a radio signal; and
   a processor configured to control the RF unit,
   wherein the processor is configured to transmit information about a data transmission power of OFDM (orthogonal frequency division multiplexing) symbols in a data region of a downlink subframe to the UE through the RF unit,
   wherein the information about the data transmission power is determined according to a specific condition and the specific condition includes at least one of whether a Cell-specific Reference Signal (CRS) is present within each of the OFDM symbols or a modulation scheme or a Modulation and Coding Scheme (MCS) of each of the OFDM symbols, and
   wherein the downlink subframe is a Non-Zero Power Almost Blank Subframe (NZP ABS) in which signals are transmitted at a lower transmission power than a transmission power in a normal subframe on downlink, and
   wherein, if the CRS is present within at least one of the OFDM symbols and the modulation scheme or the MCS does not permit the lower transmission power, the data transmission power of the at least one of the OFDM symbols is set to zero.

9. The eNB according to claim 8, the processor is configured to provide, through the RF unit, at least one of the information about the transmission power information and information about rate matching or puncturing performed for the subframe with a UE in a neighboring cell.

10. The eNB according to claim 8, the processor is configured to provide, through the RF unit, at least one of the information about the transmission power information and information about rate matching or puncturing performed for the subframe with the UE which is intended to receive the downlink signal.

11. The eNB according to claim 8, wherein the information about the data transmission power is determined based on a transmission power of the CRS.

12. The eNB according to claim 8, wherein the information about the data transmission power includes a UE-specific parameter for the subframe, a subframe-specific parameter, and transmission power offset information.

13. The eNB according to claim 8, the processor is configured to transmit, through the RF unit, indication information about the NZP ABS to the UE, and
    wherein the indication information is information indicating a pattern of the NZP ABS or bitmap information indicating whether the NZP ABS is present.

14. A User Equipment (UE) configured to receive a downlink signal, comprising:
    a Radio Frequency (RF) unit configured to transmit or receive a radio signal; and
    a processor configured to control the RF unit,
    wherein the processor is configured to receive information about a data transmission power within OFDM (orthogonal frequency division multiplexing) symbols in a data region of a downlink subframe from an eNB through the RF unit and demodulate a downlink data signal in the downlink subframe based on the information about the data transmission power, wherein the information about the data transmission power is determined according to a specific condition and the specific condition includes at least one of whether a Cell-specific Reference Signal (CRS) is present within each of the OFDM symbols or a modulation scheme or a Modulation and Coding Scheme (MCS) of each of the OFDM symbols, and wherein the downlink subframe is a Non-Zero Power Almost Blank Subframe (NZP ABS) in which signals are transmitted at a lower transmission power than a transmission power in a normal subframe on downlink, and wherein, if the CRS is present within at least one of the OFDM symbols and the modulation scheme or the MCS does not permit the lower transmission power, the data transmission power of the at least one of the OFDM symbols is set to zero.

* * * * *